US012533285B1

(12) United States Patent
Leng

(10) Patent No.: US 12,533,285 B1
(45) Date of Patent: Jan. 27, 2026

(54) SEXUAL DEVICE PROVIDING MULTIPLE STIMULATIONS THROUGH SUCKING AND LICKING ACTIONS

(71) Applicant: Dongguan Guigong Adult Supplies. Co., Ltd., Dongguan (CN)

(72) Inventor: Xingchen Leng, Dongguan (CN)

(73) Assignee: Dongguan Guigong Adult Supplies. Co., Ltd., Dongguan (CN)

( * ) Notice: Subject to any disclaimer, the term of this patent is extended or adjusted under 35 U.S.C. 154(b) by 0 days.

(21) Appl. No.: 19/093,151

(22) Filed: Mar. 27, 2025

(30) Foreign Application Priority Data

Feb. 28, 2025 (CN) ......................... 202510242600.7
Feb. 28, 2025 (CN) ......................... 202520353998.7

(51) Int. Cl.
*A61H 19/00* (2006.01)
*A61H 23/02* (2006.01)

(52) U.S. Cl.
CPC ............. *A61H 19/34* (2013.01); *A61H 23/02* (2013.01); *A61H 2201/1676* (2013.01); *A61H 2201/5056* (2013.01)

(58) Field of Classification Search
CPC .... A61H 19/34; A61H 23/02; A61H 23/0254; A61H 2201/1676; A61H 2201/5056
See application file for complete search history.

(56) References Cited

U.S. PATENT DOCUMENTS 3,683,901 A 8/1972 Wegener
12,178,773 B1 * 12/2024 Wang ..................... A61H 19/44
2024/0238155 A1 * 7/2024 Huang ............... A61H 23/0254
2024/0252383 A1 * 8/2024 Liufu ................. A61H 23/0263
2024/0252384 A1 * 8/2024 Zhou ...................... A61H 7/008
2025/0090412 A1 * 3/2025 Chen ...................... A61H 23/02
2025/0161149 A1 * 5/2025 Wang ................. A61H 23/0254

FOREIGN PATENT DOCUMENTS

DE 202025100364 U1 * 2/2025 ............ A61H 19/34

OTHER PUBLICATIONS

English translation translation for DE 202025100364, machined translated by espacenet.com.*

* cited by examiner

*Primary Examiner* — Tu A Vo
*Assistant Examiner* — Kelsey E Baller
(74) *Attorney, Agent, or Firm* — Rondaus PLLC; George Liu

(57) ABSTRACT

Disclosed is a sexual device providing multiple stimulations through sucking and licking actions, comprising a housing, a base, a flexible body, a driving seat, a driving apparatus, a first swing arm and a second swing arm, wherein the base is fixedly mounted to the housing, and a guiding groove is arranged in a middle portion of the base; the flexible body is arranged above the base, the flexible body comprises a strip-shaped member arranged in the middle and a clamping portion arranged on the periphery, the driving seat is slidably mounted in the guiding groove, the driving apparatus is configured to drive the driving seat to slide to and fro along a vertical direction, the first swing arm is mounted to the base in a swinging manner, the number of the first swing arms is at least one.

18 Claims, 11 Drawing Sheets

Folded state

Unfolded state

SEXUAL DEVICE PROVIDING MULTIPLE STIMULATIONS THROUGH SUCKING AND LICKING ACTIONS

CROSS-REFERENCE TO RELATED APPLICATIONS

This application claims priority to Chinese Patent Application No. 2025102426007, filed on Feb. 28, 2025, and Chinese Patent Application No. 2025203539987, filed on Feb. 28, 2025. All of the aforementioned applications are incorporated herein by reference in its entirety.

TECHNICAL FIELD

The present disclosure relates to the field of sexual devices, and in particular to a sexual device providing multiple stimulations through sucking and licking actions.

BACKGROUND

In the existing female adult products, a sucking cup is generally arranged to form a structure that simulates mouth sucking, however, the existing sucking cup is generally of a fixed structure, therefore, the stimulation of the sucking cup is mainly realized through pressure changes of a vacuum apparatus, and the stimulation source is small.

In addition, a simulating tongue is generally arranged inside the sucking cup, and is further configured to simulate a licking action to stimulate such sensitive points as the clitoris.

As to the existing female adult products, although a driving structure is arranged at the position of the sucking cup, however, under the influence of small size of the adult product, the existing sucking cup and the simulating tongue have difficulty in integration and linkage because of their positions, thereby further affecting the use experience.

SUMMARY

The main objective of the present disclosure is to provide a sexual device providing multiple stimulations through sucking and licking actions, aiming at using a single driving structure to realize linkage between the sucking cup and the simulating tongue, so as to further stimulate sensitive points of females, and improve the use experience.

In order to achieve the above objective, the present disclosure provides a sexual device providing multiple stimulations through sucking and licking actions, including:

- a housing;
- a base fixedly mounted to the housing, wherein a guiding groove is arranged in a middle portion of the base;
- a flexible body arranged above the base, wherein the flexible body includes a strip-shaped member and a clamping portion, the strip-shaped member is arranged in a middle portion of the flexible body, and the clamping portion is arranged on a periphery of the flexible body;
- a driving seat slidably mounted in the guiding groove;
- a driving apparatus configured to drive the driving seat to slide to and fro along a vertical direction;
- a first swing arm mounted to the base in a swinging manner, wherein the number of the first swing arms is at least one, the first swing arm extends into the clamping portion, and the first swing arm is capable of driving the clamping portion to swing;

- a second swing arm mounted to the base in a swinging manner, wherein the second swing arm is located above the driving seat, and the second swing arm extends into the strip-shaped member; and
- the driving seat is configured to drive the first swing arm and the second swing arm to swing to and fro.

The driving apparatus drives the driving seat to swing to and fro, and further drives the first swing arm located on the periphery of the base and the second swing arm located in the middle of the base to swing to and fro, thereby further enabling the clamping portion and the strip-shaped member to swing to and fro.

When the clamping portion and the strip-shaped member are relatively close to each other, the vulva and the clitoris are stimulated by clamping and touching, and at the same time, when the second swing arm drives the strip-shaped member to swing to and fro, an action of simulating the tongue is capable of further improving the effect of licking by a tongue.

Figure 1:
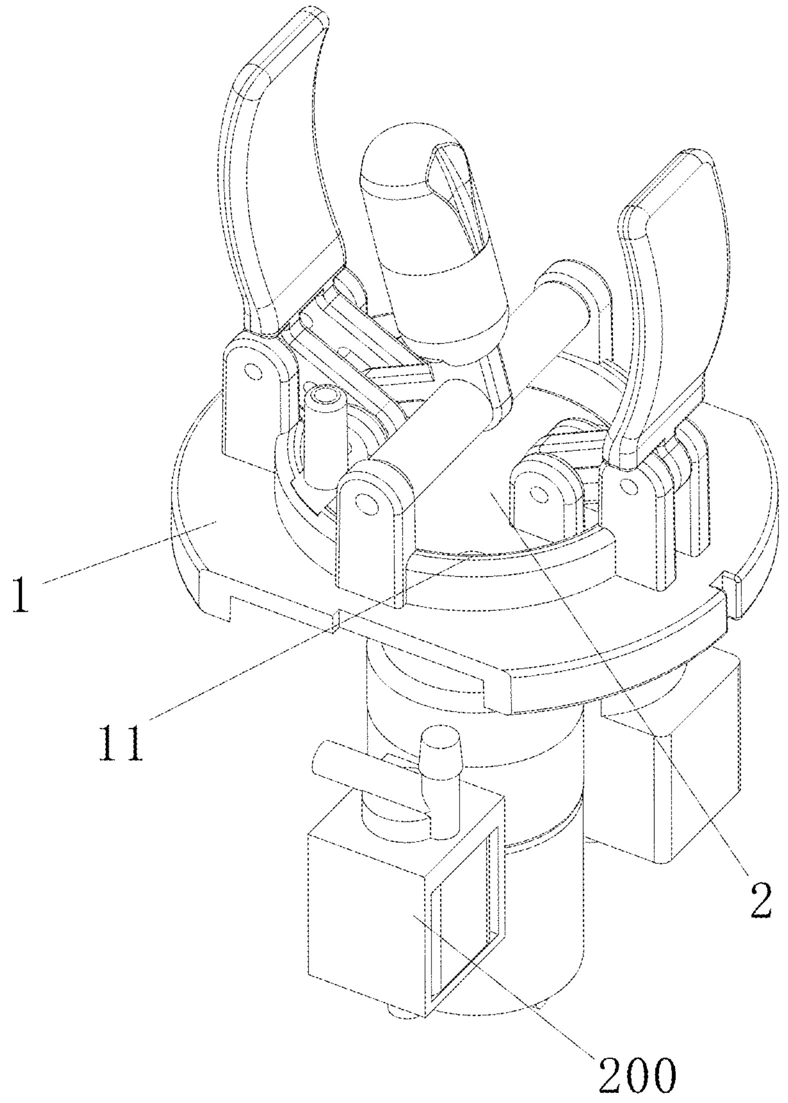
FIG. 1 is a three-dimensional schematic diagram of a movement.

Reference numerals in the figures:

1. base, 11. guiding groove,

2. driving seat, 20. positioning arm, 21. driving shaft,

3. driving apparatus, 3*a*. telescopic motor, 3*b*. linkage structure, 31. rotating motor, 32. rotating seat, 33. guided sliding seat, 33*a*. guided sliding groove, 34. vertically sliding seat, 35. arc-shaped groove, 36. ball,

4. first swing arm, 40. first driving arm, 41. first rotating shaft, 401. active swing arm, 4011. active driving arm, 402. driven swing arm, 4021. driven driving arm,

5. second swing arm, 50. second driving arm, 51. second rotating shaft,

6. clamping groove,

71. first pivot seat, 72. second pivot seat,

81. first strip-shaped groove, 82. second strip-shaped groove,

9. flexible body, 91. strip-shaped member, 91*a*. second slot, 92. clamping portion, 92*a*. first slot, 92*b*. strip-shaped structure, 92*c*. closed-loop structure,

100. housing, 101. vibrating apparatus,

200. air pump, 201. connecting hole, 202. first chamber, 203. second chamber,

300. decorative member, 301. notch, 302. arc-shaped portion.

DETAILED DESCRIPTION OF THE EMBODIMENTS

The technical solutions in the embodiments of the present disclosure will be described clearly and completely below in combination with the accompanying drawings, and apparently, the described embodiments are merely a part but not all of the embodiments of the present disclosure. Based on the embodiments in the present disclosure, all the other embodiments obtained by those skilled in the art without any creative effort shall all fall within the protection scope of the present disclosure.

It should be noted that if directional indications (such as upper, lower, left, right, forward, backward, top, bottom, inward, outward, vertical, transverse, longitudinal, counter-clockwise, clockwise, circumferential, radial, axial . . . ) are involved in the embodiments of the present disclosure, such directional indications are merely used for explaining relative positional relationships, movement conditions and the like between various components in a particular attitude (as shown in the accompanying drawings), and if such particular attitude is changed, such directional indications are also changed accordingly.

Furthermore, if descriptions such as "first" or "second" are involved in the embodiments of the present disclosure, the description of "first" or "second" is merely used for descriptive purposes and should not be construed as indicating or implying their relative importance or implicitly specifying the number of technical features indicated. Therefore, the feature defined as "first" or "second" may explicitly or implicitly include at least one such feature. In addition, the technical solutions between the various embodiments may be combined with each other, but must be based on what is achievable by those skilled in the art, and when the combination of technical solutions appears to be contradictory or unachievable, it should be assumed that the combination of such technical solutions does not exist or does not fall within the protection scope of the claims of the present disclosure.

As shown in FIG. 1 to FIG. 9, a sexual device providing multiple stimulations through sucking and licking actions includes:

- a housing 100;
- a base 1 fixedly mounted to the housing 100, wherein a guiding groove 11 is arranged in a middle portion of the base 1;
- a flexible body 9 arranged above the base 1, wherein the flexible body 9 includes a strip-shaped member 91 and a clamping portion 92, the strip-shaped member 91 is arranged in a middle portion of the flexible body 9, and the clamping portion 92 is arranged on a periphery of the flexible body 9;
- a driving seat 2 slidably mounted in the guiding groove 11;
- a driving apparatus 3 configured to drive the driving seat 2 to slide to and fro along a vertical direction;
- a first swing arm 4 mounted to the base 1 in a swinging manner, wherein the number of the first swing arms 4 is at least one, and the first swing arm 4 extends into the clamping portion 92 and is capable of driving the clamping portion 92 to deform;
- a second swing arm 5 mounted to the base 1 in a swinging manner, wherein the second swing arm 5 is located above the driving seat 1, and the second swing arm 5 extends into the strip-shaped member 91; and
- the driving seat 2 is configured to drive the first swing arm 4 and the second swing arm 5 to swing to and fro.

When the clamping portion 92 and the strip-shaped member 91 are relatively close to each other, the vulva and the clitoris are clamped and touched, and at the same time, when the second swing arm 5 drives the strip-shaped member 91 to swing to and fro, an action of simulating the tongue is capable of further improving the effect of licking by a tongue.

Specifically, the first swing arm 4 is pivotally mounted on the base 1 through a first rotating shaft 41, and a lower portion of the first swing arm 4 is provided with a first driving arm 40;

- the second swing arm 5 is pivotally mounted on the base 1 through a second rotating shaft 51, and a lower portion of the second swing arm 5 is provided with a second driving arm 50; and
- the driving seat 2 is provided with a driving shaft 21, and at least one first driving arm 40 and the second driving arm 50 extend in opposite directions and are connected to the same driving shaft 21.

In actual design, how to realize linked swing of the second swing arm 5 and the first swing arm 4 above the driving seat 2 is the key to the design, and the first rotating shaft 41 and the second rotating shaft 51 are arranged on the base 1, such that the first swing arm 4 and the second swing arm 5 swing with the base 1 serving as a fulcrum;

- when the first driving arm 40 and the second driving arm 50 are connected through the same driving shaft 21, and when the driving seat 2 moves along a vertical direction, the corresponding first swing arm 4 and the second swing arm 5 are linked to swing through one driving shaft 21; and
- on the basis of one or more of the above embodiments, as a preferred embodiment, one, two, three or four first swing arms 4 are arranged, and the first driving arm 40 of any one of the first swing arms 4 is connected to the second driving arm 50 of the second swing arm 5 through the same driving shaft 41, such that the stroke in a vertical direction is converted to a swing stroke of the corresponding first swing arm 4 and the second swing arm 5, and the problem that the existing rotating shafts of the movement are unable to be linked when they are not located in the same radial position is solved.

Specifically, the first driving arm 40 is provided with a first strip-shaped groove 81, and the second driving arm 50 is provided with a second strip-shaped groove 82;

- the driving shaft 21 is capable of penetrating into the first strip-shaped groove 81 and/or the second strip-shaped groove 82; and
- the driving shaft 21 is capable of sliding along a length direction of the first strip-shaped groove 81 and/or a length direction of the second strip-shaped groove 82.

The driving shaft 21 is capable of sliding along the first strip-shaped groove 81 and/or the second strip-shaped groove 82, thereby converting a vertical stroke to a swing stroke.

Figure 4:
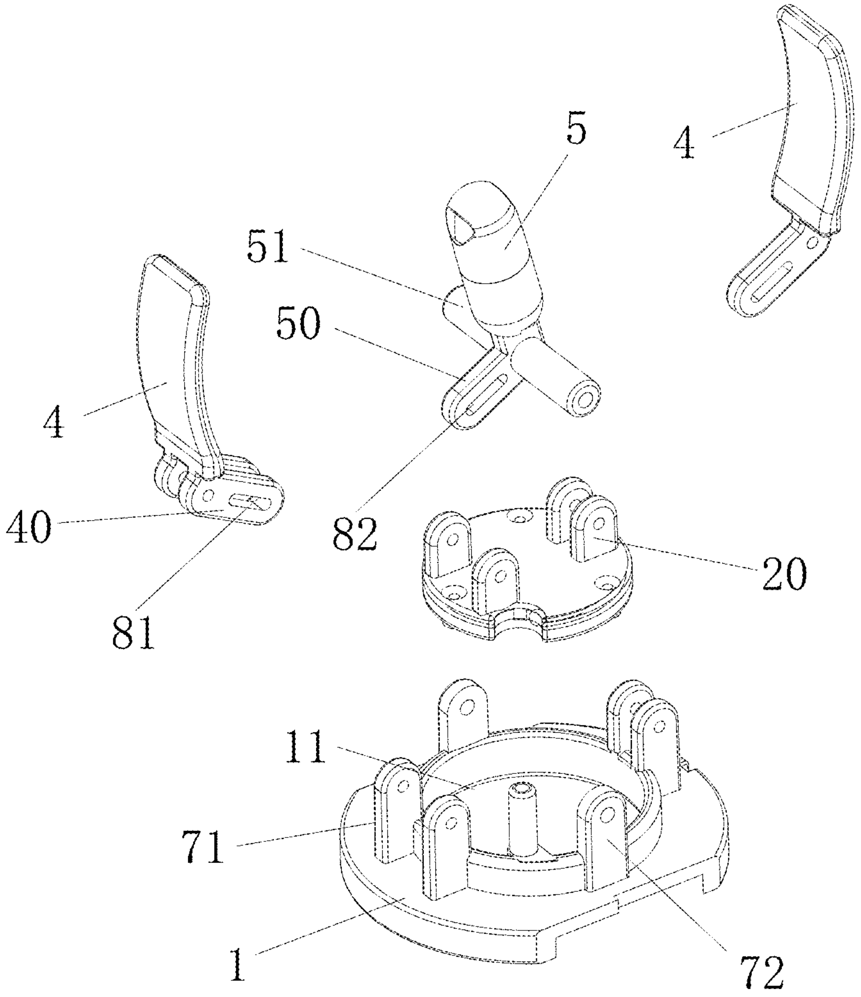
FIG. 4 is a second exploded view of a movement.

As shown in FIG. 4, on the basis of one or more of the above embodiments, as a preferred embodiment, the first strip-shaped groove 81 and the second strip-shaped groove 82 are symmetrical with respect to an axis of the driving shaft 21.

Specifically, a width of the first strip-shaped groove 81 and a width of the second strip-shaped groove 82 are greater than or equal to an outer diameter of the driving shaft 21, such that the driving shaft 21 moves along an inner wall of the first strip-shaped groove 81 and an inner wall of the second strip-shaped groove 82, and further drives the first swing arm 4 and the second swing arm 5 to swing.

On the basis of one or more of the above embodiments, as a preferred embodiment, the first driving arm 40 extends obliquely from the first rotating shaft 41; and the second driving arm 50 extends obliquely from a second rotating shaft 51.

On the basis of one or more of the above embodiments, as a preferred embodiment, when the first driving arm 40 and the second driving arm 50 are connected to the same driving shaft 21, and the number of the first driving arms 40 is two, a clamping groove 6 is arranged between the two first driving arms 40, and the second driving arm 50 is arranged in the clamping groove 6.

On the basis of one or more of the above embodiments, as a preferred embodiment, the number of the first swing arms 4 is two, and the two first swing arms 4 are arranged opposite to each other, the two first swing arms 4 include an active swing arm 401 and a driven swing arm 402, and the active swing arm 401 and the second driving arm 50 are connected to the same driving shaft 21; and an oblique angle of the driven driving arm 4021 of the driven swing arm 402 is the same as an oblique angle of the second swing arm 5, such that a linkage structure in which swing occurs on both sides as well as in the middle may be formed.

Wherein an axis of the driven driving arm 4021 and an axis of the second driving arm 50 are arranged in parallel, and an axis of the active driving arm 4011 and the axis of the second driving arm 50 are symmetrical with respect to the axis of the driving shaft 21.

Specifically, the base 1 is provided with two first pivot seats 71 which are spaced apart, wherein the first pivot seat 71 extends upwards from the base 1, and the first rotating shaft 41 is pivotally mounted to the first pivot seat 71;

two second pivot seats 72 which are spaced apart are arranged in the middle of the base 1, the second pivot seats 72 are located in the middle of the driving seat 2, and the second rotating shaft and the second swing arm 5 are integrated, the second rotating shaft 51 is pivotally mounted on the second pivot seat 72, wherein the first pivot seat 71 and the second pivot seat 72 which extend upwards are capable of providing a swing interval for the first swing arm 4 and the second swing arm 5, thereby avoiding swing interference, and wherein the swing arm and the driving arm are of a bent structure, thereby effectively reducing the overall height of the movement, and making the movement more compact.

Specifically, an upper wall of the driving seat 2 is provided with two positioning arms 20 which are spaced apart, and the positioning arms extend upwards from the driving seat 2, and two ends of the driving shaft 21 are arranged in an upper portion of the positioning arms 20, wherein the positioning arm 20 which extends upwards is capable of providing an avoidance interval under the driving shaft 21, thereby realizing swing of the first driving arm 40 and the second driving arm 50.

Figure 2:
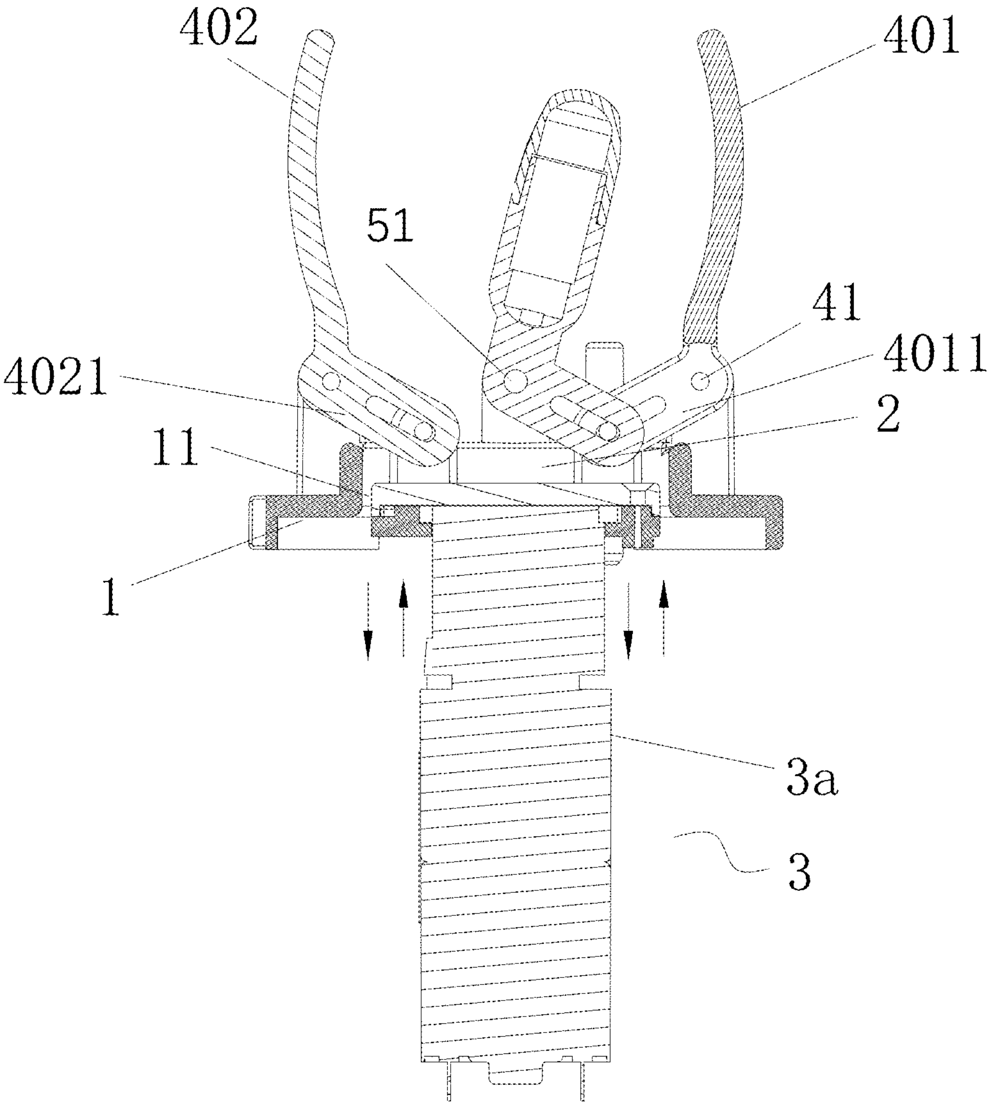
FIG. 2 is a sectional view of a movement.
Figure 5:
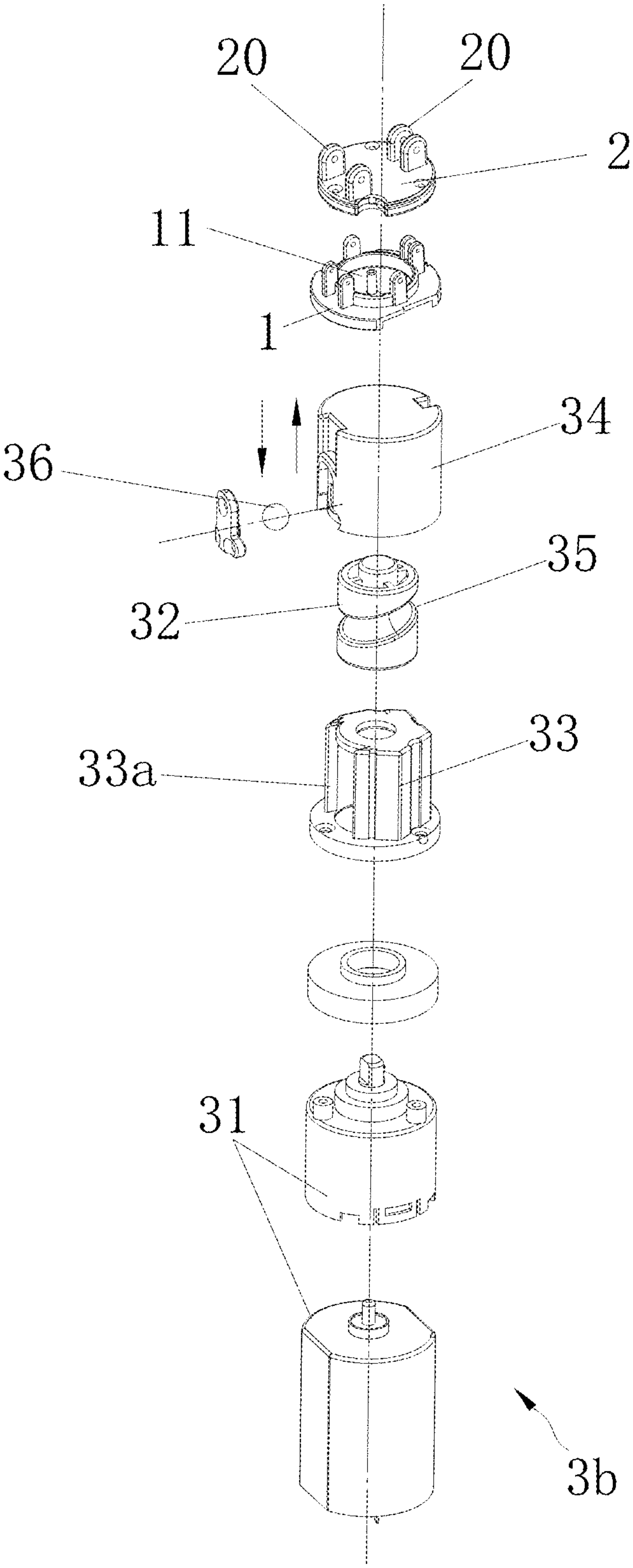
FIG. 5 is a schematic diagram of a driving apparatus.

As shown in FIG. 2 and FIG. 5, on the basis of one or more of the above embodiments, as a preferred embodiment, the driving apparatus 3 is a telescopic motor 3*a* or a linkage structure 3*b;* the linkage structure 3*a* includes a rotating motor 31, a rotating seat 32, a guided sliding seat 33 and a vertically sliding seat 34, wherein the rotating seat 32 is connected to the rotating motor 31, the guided sliding seat 33 is sleeved on an outer wall of the rotating motor 32, and the vertically sliding seat 34 is sleeved on an outer wall of the guided sliding seat 33;

a peripheral wall of the rotating motor 32 is provided with a closed-loop arc-shaped groove 35, a top end and a bottom end of the arc-shaped groove 35 are not in the same plane, and the guided sliding seat 33 is provided with a vertical guided sliding groove 33*a;* the vertically sliding seat 34 is provided with a ball 36, and a portion of the ball 36 is stuck in the arc-shaped groove 35 after passing through the guided sliding groove 33*a;* when the rotating motor 31 rotates, the rotating motor 31 drives the rotating seat 32 to rotate, and forces the ball 36 to slide along the arc-shaped groove 35 and the guided sliding groove 33*a*, and further drives the vertically sliding seat 34 to slide along a vertical direction; and an upper end of the vertically sliding seat 34 is connected to the bottom of the driving seat 2. When this linkage structure 3*b* is adopted, the rotating stroke of the motor is converted to a sliding stroke along a vertical direction, and further the vertical to-and-fro movement is more linear.

Figure 7:
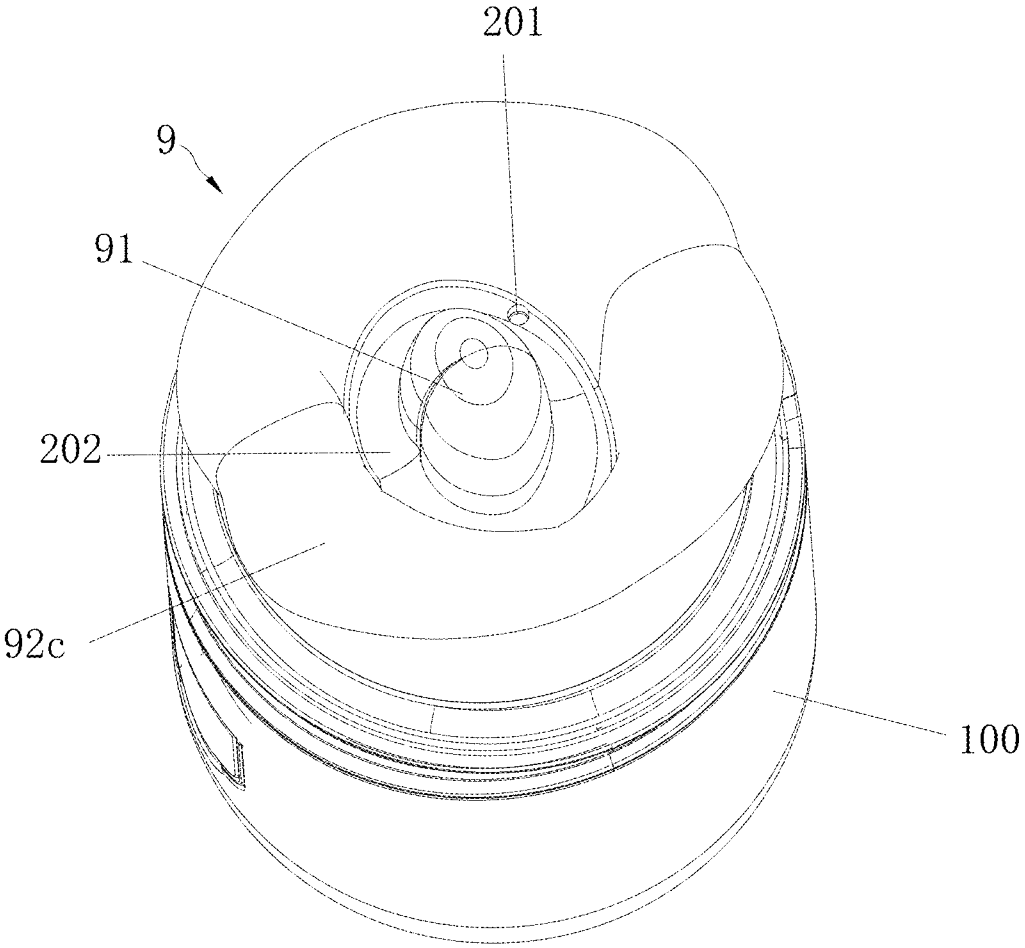
FIG. 7 is a first three-dimensional schematic diagram of the present disclosure.
Figure 8:
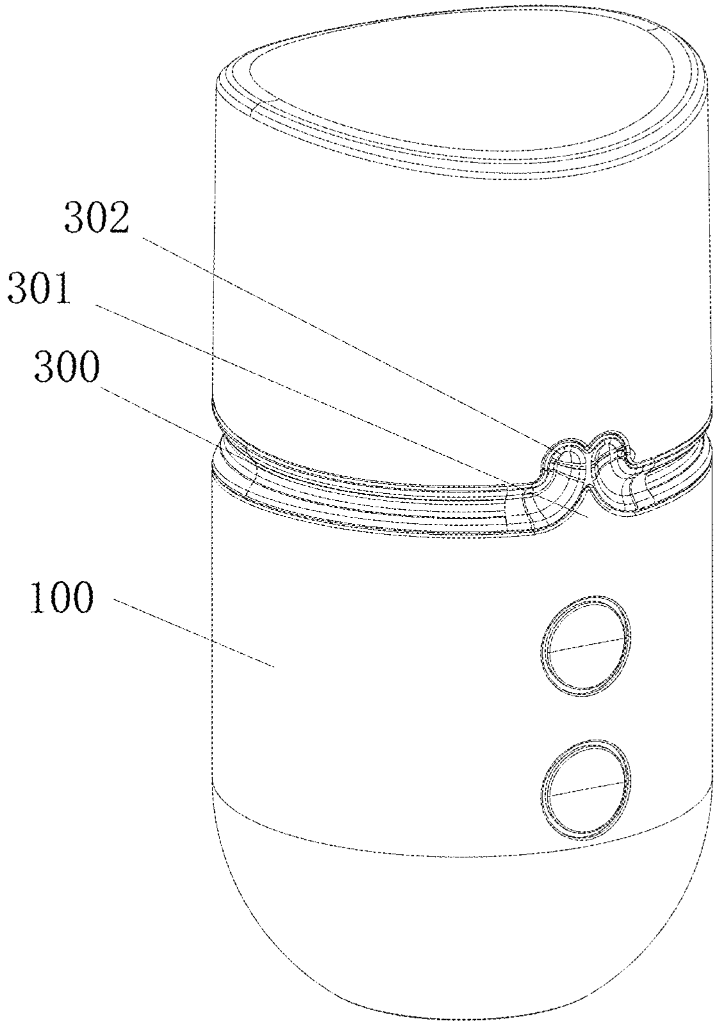
FIG. 8 is a schematic diagram of an appearance of the present disclosure.
Figure 9:
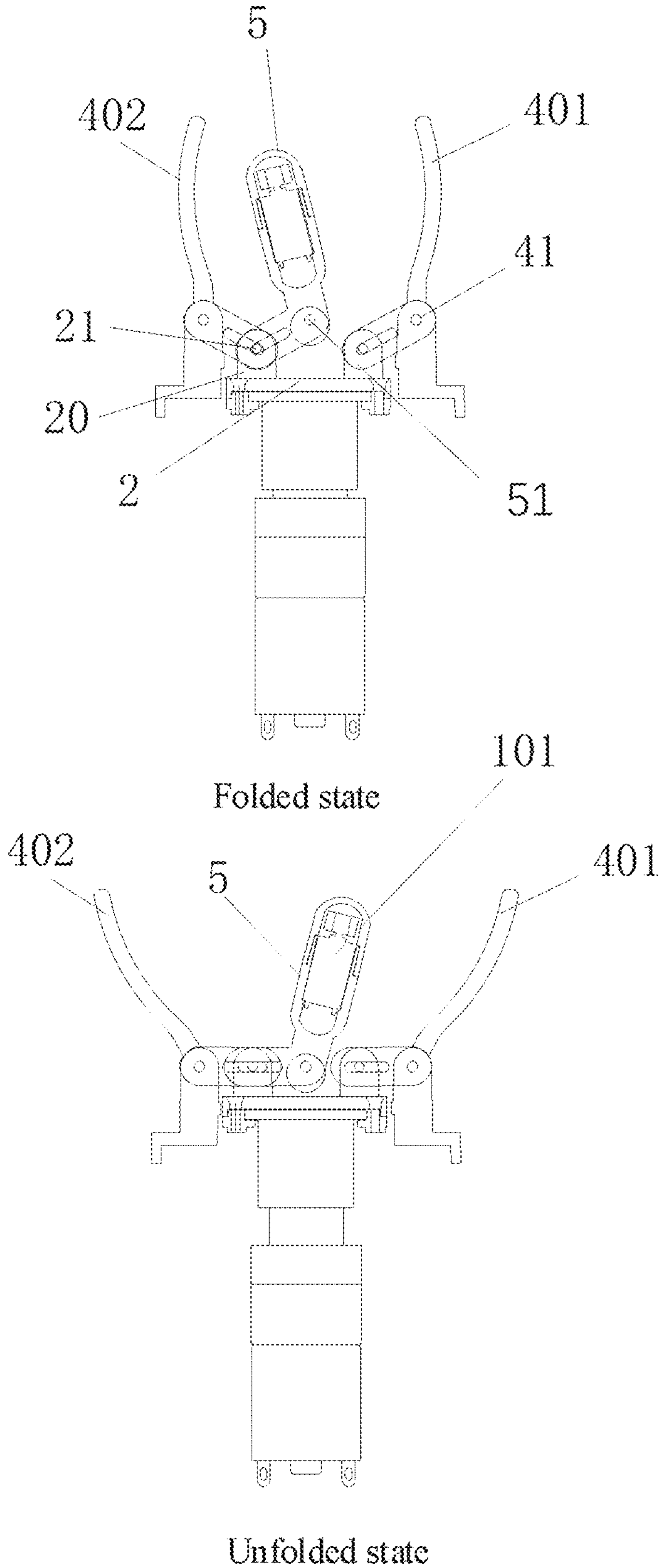
FIG. 9 is a schematic diagram of an unfolded state and a folded state of the movement.
Figure 10:
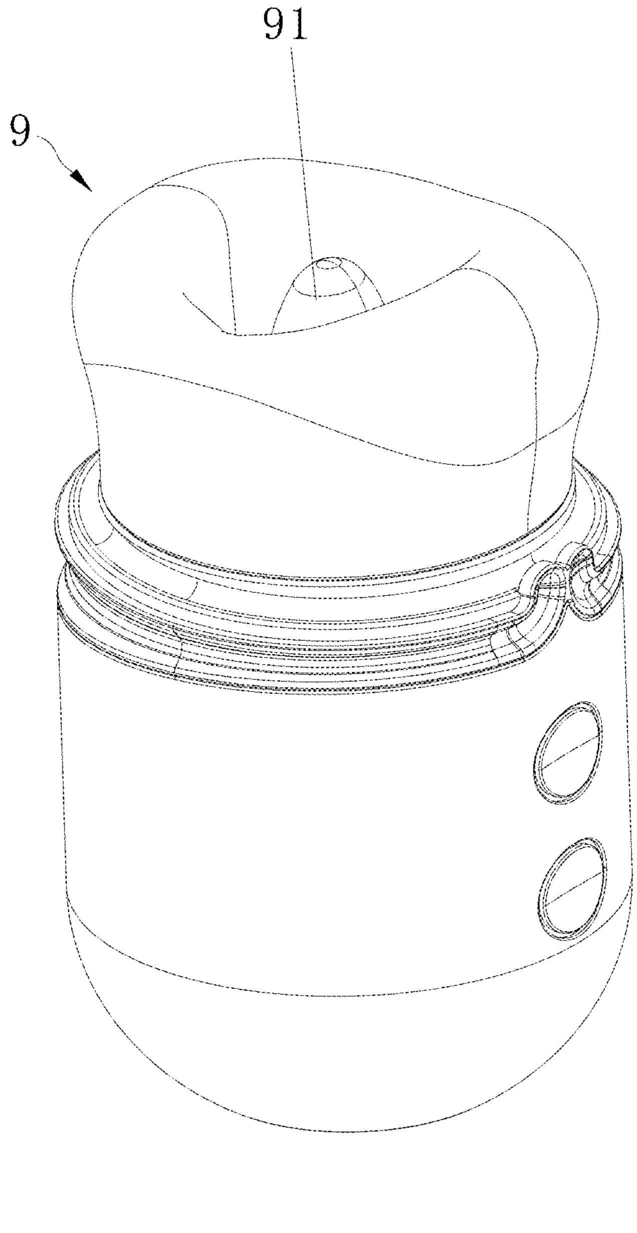
FIG. 10 is a second three-dimensional schematic diagram of the present disclosure.
Figure 11:
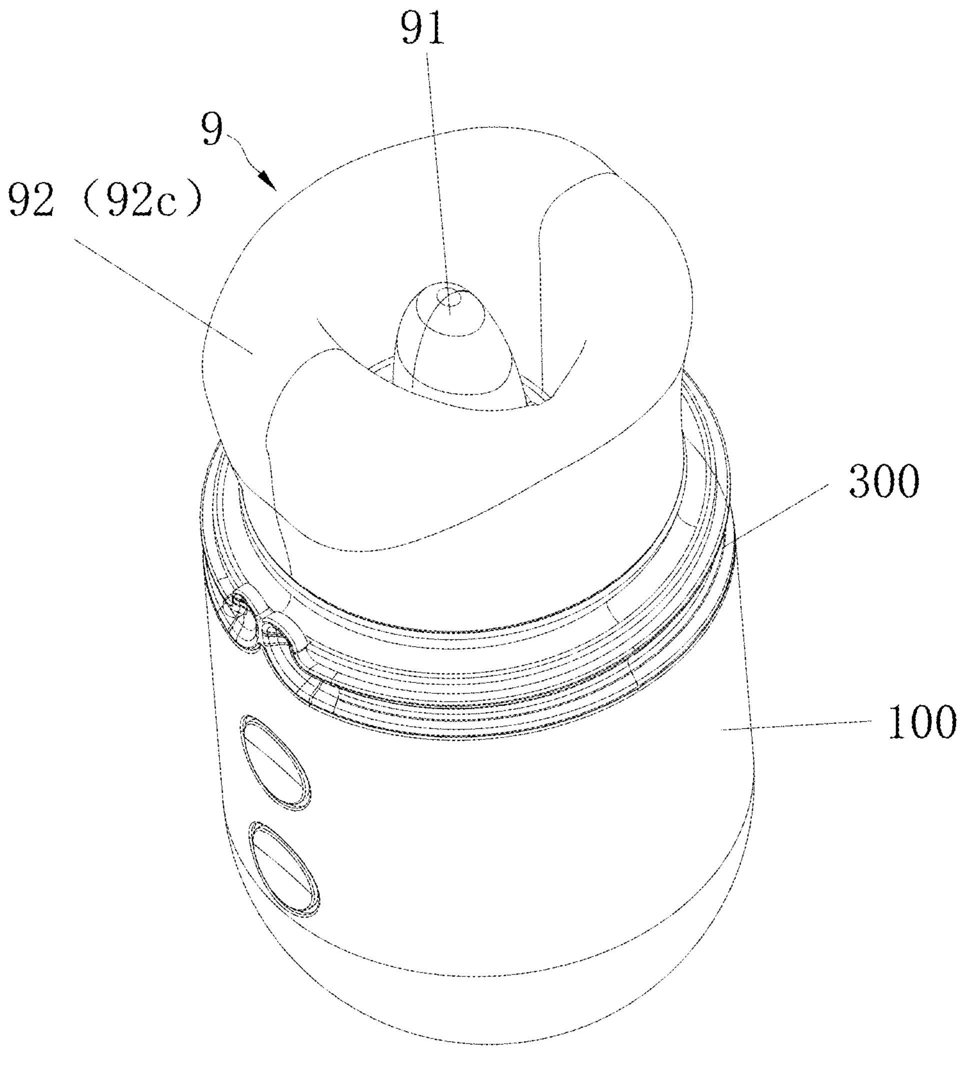
FIG. 11 is a third three-dimensional schematic diagram of the present disclosure.

As shown in FIGS. 7, 10 and 11, on the basis of one or more of the above embodiments, as a preferred embodiment, the clamping portion 92 is a closed-loop structure 92*c*, the clamping portion 92 extends upwards from the periphery of the flexible body 9, and the clamping portion 92 encloses a first chamber 202.

Specifically, a connecting hole 201 is formed at a bottom of the flexible body 9, and the connecting hole 201 is connected to an air pump 200; and when in use, the flexible body 9 fits with the human body, the first chamber 202 encloses a sucking chamber, and the air pump 200 is configured to control pressure changes in the sucking chamber, thereby further simulating sucking on the human body, vulvar stimulation, and clitoral stimulation, and providing multiple stimulations.

Figure 6:
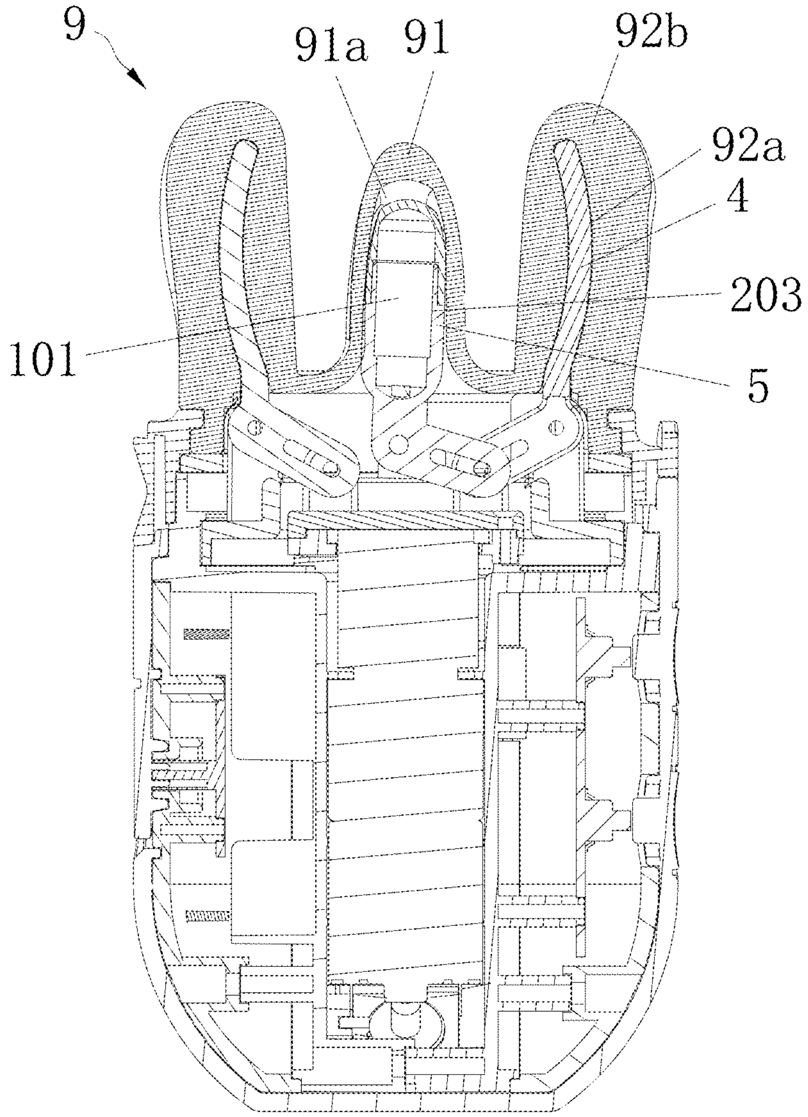
FIG. 6 is an overall sectional view of the present disclosure.

As shown in FIG. 6, on the basis of one or more of the above embodiments, as a preferred embodiment, the clamping portion 92 is of a strip-shaped structure 92*b*, and the number of the clamping portions 92 is one or two, of course, in specific embodiments, the clamping portion 92 may also not be of a closed-loop structure, in this case, the clamping portion 92, although incapable of simulating sucking, is also capable of stimulating the vulva, and further providing a clamping or touching effect.

As shown in FIG. 6, on the basis of one or more of the above embodiments, as a preferred embodiment, the second swing arm 5 is of a cylindrical structure, and the second swing arm 5 is internally provided with a second chamber 203, wherein a larger volume is capable of providing a larger contact area and further increasing stimulation to the clitoris.

In an embodiment of the present disclosure, the second chamber 203 is internally provided with a vibrating apparatus 101, such that in addition to providing an effect of licking by a tongue, the second swing arm 5 also provides a vibrating effect and further improves stimulation.

Wherein the vibrating apparatus 101 may be a vibrating motor.

Figure 3:
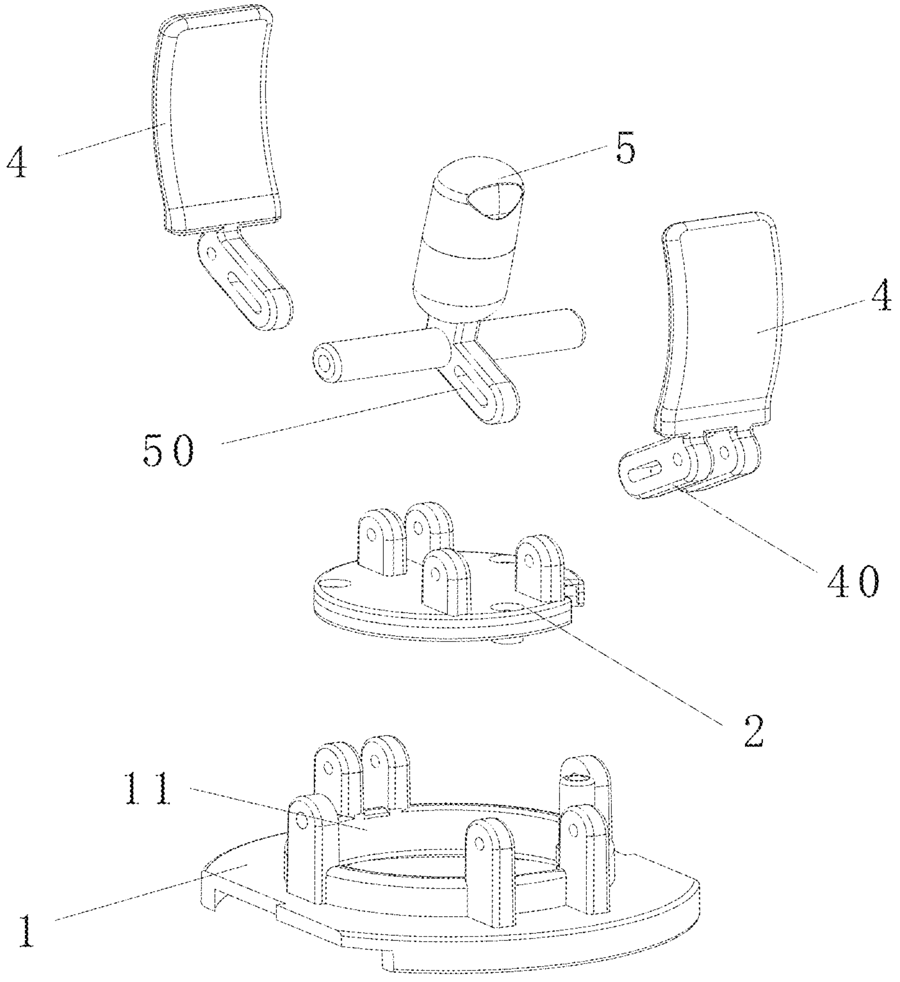
FIG. 3 is a first exploded view of a movement.

As shown in FIG. 3 and FIG. 6, on the basis of one or more of the above embodiments, as a preferred embodiment, the first swing arm 4 is arc-shaped.

Specifically, the clamping portion 92 is provided with a first slot 92*a*, and the first slot 92*a* allows for extension of the first swing arm 4.

In an embodiment of the present disclosure, the strip-shaped portion 91 is provided with a second slot 91*a*, and the second slot 91*a* allows for extension of the second swing arm 5, thereby further facilitating the mounting of the first swing arm 4 and the second swing arm 5.

As shown in FIG. 11, on the basis of one or more of the above embodiments, as a preferred embodiment, an upper end of the housing 100 is provided with the flexible body 9, and a decorative member 300 is arranged at an articulated end between the housing 100 and the flexible body 9, thereby effectively improving the recognition of products.

In an embodiment of the present disclosure, the decorative member 300 is ring-shaped, the decorative member 300 is provided with a notch 301, two ends of the notch 301 are each provided with an arc-shaped portion 302 which is arc-shaped and extends upwards, and the two arc-shaped portions 302 are symmetrical to each other, wherein the housing 100 may also be provided with a cover body, and a lower end of the cover body is stuck onto a lower end of the flexible body 9 or an upper end of the decorative member.

Specifically, the decorative member 300 may also be arranged in the middle of the housing 100, to further improve the product features.

In addition, the flexible body 9 may be made of a transparent material or a colored material, wherein the clamping portion 92 may have a predetermined thickness.

Wherein the flexible body is shaped like a mouth and acts as a mimetic structure.

The above is merely a preferred embodiment of the present disclosure, and is not intended to limit the patent scope of the present disclosure, and any equivalent structural transformations made under the inventive concept of the present disclosure using the contents of the specification and the accompanying drawings of the present disclosure, or any equivalent structural transformations directly/indirectly applied in other related technical fields are all included in the protection scope of the patent of the present disclosure.

What is claimed is:

1. A sexual device providing multiple stimulations through sucking and licking actions, comprising:

a housing (100);

a base (1) fixedly mounted to the housing (100), wherein a guiding groove (11) is arranged in a middle portion of the base (1);

a flexible body (9) arranged above the base (1), wherein the flexible body (9) comprises a strip-shaped member (91) and a clamping portion (92), the strip-shaped member (91) is arranged in a middle portion of the flexible body (9), and the clamping portion (92) is arranged on a periphery of the flexible body (9);

a driving seat (2) slidably mounted in the guiding groove (11);

a driving apparatus (3) configured to drive the driving seat (2) to slide to and fro along a vertical direction; and the driving apparatus (3) is a telescopic motor (3*a*) or a linkage structure (3*b*);

at least one first swing arm (4) mounted to the base (1) in a swinging manner, wherein the at least one first swing arm (4) extends into the clamping portion (92), and the at least one first swing arm (4) is configured to drive the clamping portion (92) to swing;

a second swing arm (5) mounted to the base (1) in a swinging manner, wherein the second swing arm (5) is located above the driving seat (2), and the second swing arm (5) extends into the strip-shaped member (91); and the driving seat (2) is configured to drive the at least one first swing arm (4) and the second swing arm (5) to swing to and fro;

wherein the at least one first swing arm (4) is pivotally mounted on the base (1) through a first rotating shaft (41), and a lower portion of the at least one first swing arm (4) is provided with a first driving arm (40);

wherein the second swing arm (5) is pivotally mounted to the base (1) through a second rotating shaft (51), and a lower portion of the second swing arm (5) is provided with a second driving arm (50); and wherein the driving seat (2) is provided with a driving shaft (21), and at least one first driving arm (40) and the second driving arm (50) extend in opposite directions and are connected to the driving shaft (21);

wherein the at least one first swing arm (4) is configured as two first swing arms (4), and the two first swing arms (4) are arranged opposite to each other, the two first swing arms (4) comprise an active swing arm (401) and a driven swing arm (402), and the active swing arm (401) and the second driving arm (50) are linked through the driving shaft (21); and wherein an axis of a driven driving arm (4021) and an axis of the second driving arm (50) are arranged in parallel, and an axis of an active driving arm (4011) and the axis of the second driving arm (50) are symmetrical with respect to the axis of the driving shaft (21).

2. The sexual device providing multiple stimulations through sucking and licking actions according to claim 1, wherein the clamping portion (92) is of a closed-loop structure (92*c*), the clamping portion (92) extends upwards from the periphery of the flexible body (9), and the clamping portion (92) encloses a first chamber (202).

3. The sexual device providing multiple stimulations through sucking and licking actions according to claim 2, wherein a connecting hole (201) is formed at a bottom of the flexible body (9), and the connecting hole (201) is connected to an air pump (200); and the air pump (200) is configured to control pressure changes in the first chamber (202).

4. The sexual device providing multiple stimulations through sucking and licking actions according to claim 1, wherein the clamping portion (92) is a strip-shaped structure (92*b*).

5. The sexual device providing multiple stimulations through sucking and licking actions according to claim 1, wherein the second swing arm (5) is of a cylindrical structure, and the second swing arm (5) is internally provided with a second chamber (203).

6. The sexual device providing multiple stimulations through sucking and licking actions according to claim 5, wherein the second chamber (203) is internally provided with a vibrating apparatus (101).

7. The sexual device providing multiple stimulations through sucking and licking actions according to claim 1, wherein the first driving arm (40) is provided with a first strip-shaped groove (81), and the second driving arm (50) is provided with a second strip-shaped groove (82);

the driving shaft (21) penetrates through the first strip-shaped groove (81) and/or the second strip-shaped groove (82); and the driving shaft (21) is capable of sliding along a length direction of the first strip-shaped groove (81) and/or a length direction of the second strip-shaped groove (82).

8. The sexual device providing multiple stimulations through sucking and licking actions according to claim 7, wherein the first strip-shaped groove (81) and the second strip-shaped groove (82) are symmetrical with respect to an axis of the driving shaft (21).

9. The sexual device providing multiple stimulations through sucking and licking actions according to claim 7, wherein a width of the first strip-shaped groove (81) and a width of the second strip-shaped groove (82) are greater than or equal to an outer diameter of the driving shaft (21).

10. The sexual device providing multiple stimulations through sucking and licking actions according to claim 1, wherein the first driving arm (40) extends obliquely from the first rotating shaft (41); and the second driving arm (50) extends obliquely from the second rotating shaft (51).

11. The sexual device providing multiple stimulations through sucking and licking actions according to claim 1, wherein when the first driving arm (40) and the second driving arm (50) are connected to the driving shaft (21), the number of the first driving arms (40) is two, a clamping groove (6) is arranged between the two first driving arms (40), and the second driving arm (50) is arranged in the clamping groove (6).

12. The sexual device providing multiple stimulations through sucking and licking actions according to claim 1, wherein the base (1) is provided with two first pivot seats (71) which are spaced apart, one of the two first pivot seats (71) extends upwards from the base (1), and the first rotating shaft (41) is pivotally mounted to the one of the two first pivot seats (71);

two second pivot seats (72) which are spaced apart are arranged in the middle of the base (1), one of the two second pivot seats (72) is located in the middle of the driving seat (2), and the second rotating shaft (51) and the second swing arm (5) are integrated, and the second rotating shaft (51) is pivotally mounted in the one of the two second pivot seats (72).

13. The sexual device providing multiple stimulations through sucking and licking actions according to claim 1, wherein an upper wall of the driving seat (2) is provided with two positioning arms (20) which are spaced apart, and the positioning arms (20) extend upwards from the driving seat (2), and two ends of the driving shaft (21) are arranged in an upper portion of the positioning arms (20).

14. The sexual device providing multiple stimulations through sucking and licking actions according to claim 1, wherein the linkage structure (3*b*) comprises a rotating motor (31), a rotating seat (32), a guided sliding seat (33) and a vertically sliding seat (34), wherein the rotating seat (32) is connected to the rotating motor (31), the guided sliding seat (33) is sleeved on an outer wall of the rotating seat (32), and the vertically sliding seat (34) is sleeved on an outer wall of the guided sliding seat (33); and a peripheral wall of the rotating seat (32) is provided with a closed-loop arc-shaped groove (35), a top end and a bottom end of the arc-shaped groove (35) are not in the same plane, and the guided sliding seat (33) is provided with a vertical guided sliding groove (33*a*);

the vertically sliding seat (34) is provided with a ball (36), and a portion of the ball (36) is stuck into the arc-shaped groove (35) after passing through the guided sliding groove (33*a*);

when the rotating motor (31) rotates, the rotating motor (31) drives the rotating seat (32) to rotate, and forces the ball (36) to slide along the arc-shaped groove (35) and the guided sliding groove (33*a*), and further drives the vertically sliding seat (34) to slide along a vertical direction; and an upper end of the vertically sliding seat (34) is connected to a bottom of the driving seat (2).

15. The sexual device providing multiple stimulations through sucking and licking actions according to claim 1, wherein the at least one first swing arm (4) is arc-shaped.

16. The sexual device providing multiple stimulations through sucking and licking actions according to claim 1, wherein the clamping portion (92) is provided with a first slot (92*a*), and the at least one first swing arm (4) is capable of extending into the first slot (92*a*); and the strip-shaped portion is provided with a second slot (91*a*), and the second swing arm (5) is capable of extending into the second slot (91*a*).

17. The sexual device providing multiple stimulations through sucking and licking actions according to claim 1, wherein an upper end of the housing (100) is provided with the flexible body (9), and a decorative member (300) is arranged between the housing (100) and the flexible body (9).

18. The sexual device providing multiple stimulations through sucking and licking actions according to claim 17, wherein the decorative member (300) is ring-shaped, the decorative member (300) is provided with a notch (301), two ends of the notch (301) are each provided with an arc-shaped portion (302) which extends upwards, and the two arc-shaped portions (302) are symmetrical to each other.

* * * * *